United States Patent
Lang

(10) Patent No.: US 7,217,779 B2
(45) Date of Patent: May 15, 2007

(54) PHOSPHORIC ESTER DEMULSIFIER COMPOSITION

(75) Inventor: Frank T. Lang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 79 days.

(21) Appl. No.: 10/389,447

(22) Filed: Mar. 14, 2003

(65) Prior Publication Data
US 2004/0180969 A1    Sep. 16, 2004

(51) Int. Cl.
*C10G 33/00*    (2006.01)

(52) U.S. Cl. ............... 528/108; 210/708; 210/710; 525/480; 525/507; 528/110

(58) Field of Classification Search ............ 210/708, 210/710; 528/108, 110; 525/480, 507
See application file for complete search history.

(56) References Cited

U.S. PATENT DOCUMENTS

| | | | | |
|---|---|---|---|---|
| 2,454,542 A | * | 11/1948 | Book et al. ............ | 525/480 |
| 4,054,617 A | * | 10/1977 | Papalos et al. .......... | 558/162 |
| 4,949,743 A | | 8/1990 | Broom | |
| 5,008,035 A | | 4/1991 | Broom | |
| 5,667,727 A | * | 9/1997 | Breen et al. .......... | 516/193 |
| 6,204,420 B1 | | 3/2001 | Miller et al. | |

FOREIGN PATENT DOCUMENTS

| | | | |
|---|---|---|---|
| RU | 2154090 | | 8/2000 |
| RU | 2154090 | * | 10/2000 |

OTHER PUBLICATIONS

J. Giles, Electrolytic Conduction in Amorphous Salt Complexed Polyethers, 1987, Solid State Ionics, 24, (1987) 155-67.*
J. Giles et al., Ionic Conduction in Phosphateester-croslinked Poly-(ethylene-glycol)s Complexed with Lithium Trifluoromethanesulphonate, Polymer Communicaions, 1986, vol. 27, 361-62.*
Polymer Technology Dictionary by T, Whelan, Chapman & Hall, 1994, pp. 326, 335.*

* cited by examiner

*Primary Examiner*—Irina S. Zemel
(74) *Attorney, Agent, or Firm*—Michael B. Martin; Thomas M. Breininger

(57) ABSTRACT

A phosphoric ester demulsifier composition prepared by reacting one or more alkylphenol-formaldehyde resin alkoxylates or one or more polyalkylene glycols, or a mixture thereof, with about 0.001 to about 1.0 molar equivalents of one or more phosphorous compounds selected from phosphorous oxychloride, phosphorous pentoxide and phosphoric acid and a method of using the demulsifier composition to resolve water-in-oil emulsions.

11 Claims, No Drawings

PHOSPHORIC ESTER DEMULSIFIER COMPOSITION

TECHNICAL FIELD

This invention relates to compositions and methods of resolving water-in-oil emulsions. More particularly, this invention concerns phosphoric esters of alkylphenol-formaldehyde resin alkoxylates and/or polylakylene glycols and use of the phosphoric esters to resolve water-in-oil emulsions, particularly emulsions of water in crude oil.

BACKGROUND OF THE INVENTION

Crude oil produced from the geological formations can contain various amounts of water. Water and crude oil are naturally non-miscible. However, when naturally occurring interfacial active compounds are present, these compounds can aggregate on the oil and water interface and cause water to form droplets within the bulk oil phase. During crude oil lifting through production tubings, the oil and water encounters an increased mixing energy from rapid flow through chokes and bends. This additional mixing energy can emulsify the oil and water. This oil external, water internal two phase system is commonly referred to as crude oil emulsion. This emulsion can be quite stable. However, the presence of water in crude oil can interfere with refining operations, induce corrosion, increase heat capacity and reduce the handling capacity of pipelines and refining equipment. Therefore, The crude oil that is to be shipped out of the oilfield should be practically free of water and usually has a maximum water content limit of about three percent, depending on the type of crude and oil company.

The emulsified water can also contain various amounts of salts. These salts are detrimental to crude oil refining processes due to potential corrosion in the refinery. In crude oil refining, desalting techniques comprise the deliberate mixing of the incoming crude oil with a fresh "wash water" to extract the water soluble salts and hydrophilic solids therefrom.

Primary dehydration of the crude oil occurs in oil field water oil separation systems such as "free water knock out" and "phase separators". Quite often these systems are not adequate for efficient separation due to factors such as over production, unexpected production changes and system underdesigns. In these cases, emulsion breaking chemicals are added to the production processes to assist and promote rapid water oil separations.

Commonly used emulsion breaking chemicals include alkylphenol formaldehyde resin alkoxylate (AFRA), polyalkylene glycol (PAG), organic sulfonates, and the like. These compounds, however, may not provide satisfactory performance in all instances. Accordingly, there is an ongoing need for new, economical and effective chemicals and processes for resolving emulsions into their component parts of oil and water or brine.

SUMMARY OF THE INVENTION

This invention is a phosphoric ester demulsifier composition prepared by reacting one or more alkylphenol-formaldehyde resin alkoxylates or one or more polyalkylene glycols, or a mixture thereof, with about 0.001 to about 1.0 molar equivalents of one or more phosphorous compounds selected from phosphorous oxychloride, phosphorous pentoxide and phosphoric acid.

The phosphoric ester demulsifier of this invention can improve the performance of currently used demulsifers by providing more rapid water separation as well as lower basic sediments and water (BS&W) in the shipping crude.

DETAILED DESCRIPTION OF THE INVENTION

The phosphoric ester demulsifier composition of this invention is prepared by reacting one or more alkylphenol-formaldehyde resin alkoxylates or one or more polyalkylene glycols, or a mixture thereof, with up to about one molar equivalent of a phosphorous compound selected from phosphorous oxychloride, phosphorous pentoxide or phosphoric acid. If too much phosphorous compound is used, the resulting phosphoric ester composition gels as a result of excessive cross linking. Accordingly, the amount of phosphorous compound used may be empirically determined as the amount required to impart the desired demulsifying characteristics to the composition while simultaneously avoiding gelling of the composition.

In a preferred aspect this invention, the alkylphenol-formaldehyde resin alkoxylate or polyalkylene glycol is reacted with about 0.01 to about 0.5 molar equivalents of the phosphorous compound. A preferred phosphorous compound is phosphorous oxychloride.

The reaction is preferably conducted by heating a solution of the alkylphenol-formaldehyde resin alkoxylates or polyalkylene glycols in a suitable solvent to a temperature of about 60° C. to about 85° C., preferably about 70° C. and then adding the phosphorous compound in portions. The reaction mixture is then heated for about one to about three hours. When the phosphorous compound is phosphorous oxychloride, the reactor is purged with nitrogen during the course of the reaction to drive off HCl gas as it is formed.

Suitable solvents include aliphatic solvents such as kerosene and diesel and aromatic solvents such as xylene, toluene and light or heavy aromatic naphtha. Aromatic solvents are preferred.

The resulting phosphoric ester comprises a mixture of mono-, di-, or tri-phosphate esters where the proportion of these components depends on the reaction conditions. In addition, cross-linked species can exist depending on the amount of reacting components.

Accordingly, in an aspect, this invention is a method of preparing a phosphoric ester demulsifier composition comprising reacting one or more alkylphenol-formaldehyde resin alkoxylates or one or more polyalkylene glycols, or a mixture thereof, with about 0.001 to about 1 molar equivalents of one or more phosphorous compounds selected from phosphorous oxychloride, phosphorous pentoxide and phosphoric acid.

"Alkylphenol-formaldehyde resin alkoxylate" means the reaction product of one or more alkylphenol-formaldehyde resins as described herein with about 10 to about 500 molar equivalents of ethylene oxide and/or propylene oxide under heat and pressure in the presence of an acid, base or metallic catalyst. A preferred catalyst is potassium hydroxide. Preferably the reaction is conducted at a temperature of about 120° C. to about 180° C. and a pressure of about 80 psi. The reaction may be conducted neat or in a suitable solvent such as xylene, toluene, light or heavy aromatic naphtha, and the like.

In cases where the alkylphenol-formaldehyde resin is reacted with both ethylene oxide and propylene oxide, the ethylene oxide and propylene oxide may be added in random or block fashion.

Random addition of ethylene oxide and propylene oxide involves both components being added to the resin simultaneously, such that the rate of addition to the resin is controlled by their relative amounts and reaction rates. An alkoxylate prepared by random addition of ethylene oxide and propylene oxide or by addition of a mixture of propylene oxide and ethylene oxide is referred to herein as a "mixed copolymer".

In the case of block addition, either the ethylene oxide or propylene oxide is added first to the resin and allowed to react. The other component is then added and allowed to react. An alkoxylate prepared by block addition of ethylene oxide and propylene oxide is referred to herein as a "block copolymer".

Preferred alkylphenol-formaldehyde resin alkoxylates are selected from the group consisting of nonylphenol-formaldehyde resin alkoxylate, butylphenol-formaldehyde resin alkoxylate and amylphenol-formaldehyde resin alkoxylate, or a mixture thereof. Nonylphenol-formaldehyde resin alkoxylate is more preferred.

Alkylphenol-formaldehyde resins are typically prepared by the acid or base catalyzed condensation of an alkylphenol with formaldehyde. Alkyl groups are straight or branched and contain about 3 to about 18, preferably about 4 to about 12 carbon atoms.

Representative acid catalysts include dodecylbenzenesulfonic acid (DDBSA), toluene sulfonic acid, boron trifluoride, oxalic acid, and the like. Representative base catalysts include potassium hydroxide, sodium methoxide, sodium hydroxide, and the like. The alkylphenol-formaldehyde resins of this invention preferably have a molecular weight of about 1,000 to about 50,000, preferably about 1,000 to about 10,000.

Alkylphenol-formaldehyde resins are well known intermediates used in making alkylphenol-formaldehyde alkoxylate emulsion breakers. They are routinely manufactured by a number of companies including Ondeo Nalco Energy Services, Sugar Land, Tex. and Uniqema, a division of ICI, Cleveland, England.

"Polyalkylene glycol" means the reaction product of one or more $C_4$–$C_{12}$ glycols with ethylene oxide and/or propylene oxide. The ethylene oxide and propylene oxide can be added in random or block fashion as described above. The $C_4$–$C_{12}$ glycol may be straight or branched or cyclic and contains from 2 to about 6 hydroxy groups. Representative glycols include diethylene glycol, dipropylene glycol, sorbitol, sucrose, glucose, pentaerythritol, and the like. Diethylene glycol and dipropylene glycol are preferred.

Preferred polyalkylene glycols include $C_{4-12}$ glycol base polyethylene glycols, $C_{4-12}$ glycol base polypropylene glycols, $C_{4-12}$ glycol base polyethylene/polypropylene block copolymers, $C_{4-12}$ glycol base polyethylene/polypropylene mixed copolymers and $C_{4-12}$ glycol base cross-linked polyalkylene glycols.

The polyalkylene glycols preferably have a molecular weight of about 100 to about 100,000. Polyalkylene glycols are commercially available from a variety of suppliers including Ondeo Nalco Energy Services, Sugar Land, Tex.

The polyalkylene glycols and alkylphenol-formaldehyde resin alkoxylates may also be cross-linked by reaction with an agent having at least two functionalities capable of reacting with hydroxyl groups. Preferred cross linking agents include epoxides such as bisphenol A epichlorohydrin, also known as 4'4-isopropylidenediphenol-Epichlorohydrin Resin available from Ashland Chemical Company, Columbus, Ohio and isocyanates such as toluene 2,4-diisocyanate, available from Arco Chemical Company, Newtown Square, Pa.

The phosphoric ester composition of this invention is effective for resolving a broad range of hydrocarbon emulsions encountered in crude oil production, refining and chemical processing. Typical hydrocarbons include crude oil, refined oil, bitumen, condensate, slop oil, distillates, fuels and mixtures thereof. The polyester composition is also useful for resolving emulsions in butadiene, styrene, acrylic acid, and other hydrocarbon monomer process streams.

In a preferred aspect of this invention, the phosphoric ester composition is used to demulsify water-in-oil emulsions in various production and refinery processes. In a refinery desalting process, the incoming crude is deliberately mixed with wash water to remove dissolved salts and other contaminants. To extract water from the resulting water-in-crude oil emulsion, the emulsion is admixed with an effective amount of the phosphoric ester demulsifier of this invention.

In the process of resolving crude petroleum oil emulsions of the water-in-oil type, the phosphoric ester demulsifying agent of the invention is brought into contact with or caused to act upon the emulsion to be treated in any of the various methods now generally used in the petroleum industry to resolve or break crude petroleum oil emulsions with a chemical agent.

The phosphoric ester demulsifier composition may be used alone, in combination with additional phosphoric ester demulsifiers or in combination with any of a number of additional demulsifiers known in the art including alcohols, fatty acids, fatty amines, glycols and alkylphenol formaldehyde condensation products. The phosphoric ester composition may also be used in combination with corrosion inhibitors, viscosity reducers and other chemical treatments used in crude oil production, refining and chemical processing.

In a typical application, the phoshporic ester demulsifier(s) and any additional emulsion breaking chemicals are typically blended together in a suitable solvent for application to the emulsion. Representative solvents include xylene, toluene, light or heavy aromatic naphtha, and the like. Each component contributes to different treating characteristics when added to the crude oil emulsion due to their unique chemical properties.

The amount of phosphoric ester demulsifier used depends on the particular crude oil emulsion being treated. Bottle tests as described herein may be conducted on site in order to determine the optimum dose and formulation. In general, the effective amount of phosphoric ester demulsifier ranges from about 50 ppm to 500 ppm based on the volume of crude production.

The phosphoric ester demulsifier is introduced into the crude oil emulsion by injecting beneath the surface into the oil well itself, by injecting into the crude oil at the well-head or by injecting into the crude oil process stream at a point between the well-head and the final oil storage tank. The demulsifier composition may be injected continuously or in batch fashion. The injecting is preferably accomplished using electric or gas pumps.

The treated crude oil emulsion is then allowed to stand in a quiescent state until the desired separation into distinct layers of water and oil results. Once separation into distinct layers of water and oil has been effected, various means known in the art can be utilized for withdrawing the free water and separating crude oil.

In a typical process for demulsification of crude oil, a reservoir is provided to hold the composition of the invention in either diluted or undiluted form adjacent to the point where the effluent crude petroleum oil leaves the well. For convenience, the reservoir is connected to a proportioning pump capable of dropwise injecting the demulsifier of the invention into the fluids leaving the well, which then pass through a flow line into a settling tank. Generally, the well fluids pass into the settling tank at the bottom of the tank so that incoming fluids do not disturb stratification of the layers of crude petroleum oil and water which takes place during the course of demulsification.

The foregoing may be better understood by reference to the following examples, which are presented for purposes of illustration and are not intended to limit the scope of this invention.

EXAMPLE 1

Preparation of a Nonylphenol-formaldehyde Resin.

Nonylphenol (63.31% by weight) and heavy aromatic naphtha (27.69% by weight) are charged to a reactor and heated to 140–155° F. Oxalic acid (0.36% by weight) and ⅓ of the total amount of formaldehyde (2.88% by weight) are then added. The exothermic reaction is maintained at a temperature below 210° F. by cooling. After the exotherm subsides and the reaction temperature reaches about 160° F. a second portion of formaldehyde (2.88% by weight) is added and the reaction temperature is maintained between 160° F. and 210° F. A third portion of formaldehyde (2.88% by weight) is added when the reaction temperature again reaches about 160° F. After all the formaldehyde is added, the reaction mixture is heated at 210° F. for 3 hours and then the termperature is increased to about 440° F. to distill off the water formed in the condensation reaction. The reaction is stopped when the desired molecular weight of 2100–2700 (by GPC) is obtained.

EXAMPLE 2

Preparation of Nonylphenol-formaldehyde Resin Alkoxylate (49.6% Propylene Oxide, 12.3% Ethylene Oxide).

Nonylphenol-formaldehyde resin (49.59% by weight, prepared as in Example 1) is charged into a reactor followed by 0.91% of heavy aromatic naphtha (0.91% by weight). A 40 psig of nitrogen pad is maintained throughout the reaction period. KOH catalyst solution (0.40% by weight) is then added to the reactor. The reactor is then heated to 150° C. and purged with nitrogen until the moisture content is less than about 0.05%. Premixed ethylene oxide (36.82% by weight) and propylene oxide (12.28% by weight) are then added intermittently in small amounts, while maintaining a temperature of 150–160° C. and pressure not exceeding 70 psig. The reaction is exothermic and cooling is required to keep temperature and pressure in control. The reaction is stopped when all the mixed oxide has been added.

EXAMPLE 3

Preparation of a Phosphate Ester of Nonylphenol-formaldehyde Resin Alkoxylate (49.6% Propylene Oxide, 12.3% Ethylene Oxide).

Nonylphenol-formaldehyde resin alkoxylate (99.30% by weight, prepared as in Example 2) is added to a reactor. The reactor is then warmed to 70° C. and maintained at that temperature while phosphorous oxychloride (0.70% by weight) is added to the reactor. The components are then allowed to mix and react for 30 minutes. A slight nitrogen purge is then initiated into the fluid. The reaction continues for another 1.5 hours and stops.

EXAMPLE 4

Preparation of Diproplyene Glycol Base Polyalkylene Glycol (82% by Weight Propylene Oxide, 16% by Weight Ethylene Oxide).

Dipropylene glycol (1.45% by weight) is charged into a reactor followed by KOH catalyst (0.52% by weight of a 45% aqueous KOH solution). The mixture is dehydrated by heating to 300° F. with repeated vacuum at −7 psig and pressure up at 2 psig for two hours. The reactor is then set to 260 deg ° F. and propylene oxide (82.03% by weight) is added at a controlled rate to maintain a temperature of 260–285 deg ° F. and 40–110 psig. When all of the propylene oxide has been added, the reaction mixture is heated to 300° F. and ethylene oxide (16.00% by weight) is added at a controlled rate to maintain temperature between 310° F. and 350° F. and 40–72 psig. After all of the ethylene oxide has been added, heating is continued at 310-F for 30 minutes.

EXAMPLE 5

Preparation of a Phosphate Ester of Diproplyene Glycol Base Polyalkylene Glycol (82% by Weight Propylene Oxide, 16% by Weight Ethylene Oxide).

Diproplyene glycol base polyalkylene glycol (99.20% by weight, prepared as in Example 4) is added to a reactor. The reactor is then warmed to 70° C. and maintained at that temperature while phosphorous oxychloride (0.80% by weight) is added to the reactor. The components are then allowed to mix and react for 30 minutes. A slight nitrogen purge is then initiated into the fluid. The reaction continues for another 1.5 hours and stops.

Representative phosphoric ester demulsifier compositions prepared according to the methods described herein are shown in Table 1.

TABLE 1

Representative Demulsifier Compositions

| Demulsifier | Intermediate | Wt. % $POCl_3$ |
|---|---|---|
| 1 | Sorbitol base polyalkylene glycol (11.6% propylene oxide, 58.2% ethylene oxide) | 0.41 |
| 2 | Sorbitol base polyalkylene glycol (11.6% propylene oxide, 58.2% ethylene oxide) | 0 |

TABLE 1-continued

Representative Demulsifier Compositions

| Demulsifier | Intermediate | Wt. % POCl$_3$ |
|---|---|---|
| 3 | Diepoxide crosslinked dipropylene glycol base polyalkylene glycol (PPG 4000) with 54% propylene oxide | 2.06 |
| 4 | Diepoxide crosslinked dipropylene glycol base polyalkylene glycol (PPG 4000) with 54% propylene oxide | 4.10 |
| 5 | Diepoxide crosslinked dipropylene glycol base polyalkylene glycol (PPG 4000) with 54% propylene oxide | 6.15 |
| 6 | Diepoxide crosslinked dipropylene glycol base polyalkylene glycol (PPG 4000) with 54% propylene oxide | 8.20 |
| 7 | Diepoxide crosslinked dipropylene glycol base polyalkylene glycol (PPG 4000) with 54% propylene oxide | 0 |
| 8 | Diepoxide crosslinked dipropylene glycol base polyalkylene glycol (PPG 4000) with 6.3% ethylene oxide and 27% propylene oxide | 2.06 |
| 9 | Diepoxide crosslinked dipropylene glycol base polyalkylene glycol (PPG 4000) with 6.3% ethylene oxide and 27% propylene oxide | 4.11 |
| 10 | Diepoxide crosslinked dipropylene glycol base polyalkylene glycol (PPG 4000) with 6.3% ethylene oxide and 27% propylene oxide | 6.17 |
| 11 | Diepoxide crosslinked dipropylene glycol base polyalkylene glycol (PPG 4000) with 6.3% ethylene oxide and 27% propylene oxide | 8.23 |
| 12 | Diepoxide crosslinked dipropylene glycol base polyalkylene glycol (PPG 4000) with 6.3% ethylene oxide and 27% propylene oxide | 0 |
| 13 | A mixture of dipropylene glycol base polyalkylene glycol (82% propylene oxide, 16% ethylene oxide) and nonyl/dinonylphenol-formaldehyde resin alkoxylate (33% propylene oxide, 25% ethylene oxide) | 0.82 |
| 14 | A mixture of dipropylene glycol base polyalkylene glycol (82% propylene oxide, 16% ethylene oxide) and nonyl/dinonylphenol-formaldehyde resin alkoxylate (33% propylene oxide, 25% ethylene oxide) | 1.23 |
| 15 | A mixture of dipropylene glycol base polyalkylene glycol (82% propylene oxide, 16% ethylene oxide) and nonyl/dinonylphenol-formaldehyde resin alkoxylate (33% propylene oxide, 25% ethylene oxide) | 1.65 |
| 16 | A mixture of dipropylene glycol base polyalkylene glycol (82% propylene oxide, 16% ethylene oxide) and nonyl/dinonylphenol-formaldehyde resin alkoxylate (33% propylene oxide, 25% ethylene oxide) | 0 |
| 17 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 0.73 |
| 18 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 1.10 |
| 19 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 1.46 |
| 20 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 2.19 |
| 21 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 2.20 |
| 22 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 4.39 |
| 23 | A mixture of butylphenol-formaldehyde resin alkoxylate (84% propylene oxide), dipropylene glycol base polyalkylene glycol (95.5% propylene oxide, 1.2% ethylene oxide), butyl/nonylphenol-formaldehyde resin alkoxylate (10% propylene oxide, 20% ethylene oxide) | 0 |

TABLE 1-continued

Representative Demulsifier Compositions

| Demulsifier | Intermediate | Wt. % POCl$_3$ |
|---|---|---|
| 24 | A mixture of butylphenol-formaldehyde resin alkoxylate (84% propylene oxide), dipropylene glycol base polyalkylene glycol (95.5% propylene oxide, 1.2% ethylene oxide), nonylphenol-formaldehyde resin alkoxylate (12% propylene oxide, 36% ethylene oxide) | 1.10 |
| 25 | A mixture of butylphenol-formaldehyde resin alkoxylate (84% propylene oxide), dipropylene glycol base polyalkylene glycol (95.5% propylene oxide, 1.2% ethylene oxide), nonylphenol-formaldehyde resin alkoxylate (12% propylene oxide, 36% ethylene oxide) | 2.20 |
| 26 | A mixture of butylphenol-formaldehyde resin alkoxylate (84% propylene oxide), dipropylene glycol base polyalkylene glycol (95.5% propylene oxide, 1.2% ethylene oxide), nonylphenol-formaldehyde resin alkoxylate (12% propylene oxide, 36% ethylene oxide) | 0 |
| 27 | Nonylphenol-formaldehyde resin alkoxylate (49.6% propylene oxide, 12.3% ethylene oxide) | 1.87 |
| 28 | Nonylphenol-formaldehyde resin alkoxylate (49.6% propylene oxide, 12.3% ethylene oxide) | 2.81 |
| 29 | Nonylphenol-formaldehyde resin alkoxylate (49.6% propylene oxide, 12.3% ethylene oxide) | 3.75 |
| 30 | Nonylphenol-formaldehyde resin alkoxylate (49.6% propylene oxide, 12.3% ethylene oxide) | 0 |

EXAMPLE 6

Testing of Representative Phosphoric Ester Demulsifiers.

Crude emulsions from a United States west coast producing well are collected and poured into a 6-oz prescription bottles to the 100 ml mark. The crude emulsions have an API gravity of 15°. Representative phosphoric ester emulsion breaker treating compositions and unesterified control compositions are added to the bottles and the bottles are agitated to mix the contents. Agitation is then stopped, the contents are allowed to settle and the rate of water separation from oil is observed and recorded. At the end of the testing period, depending on the test requirement, either top oil, interface oil or a composite oil sample is thieved from the bottle and a centrifugation test is performed on the thieved sample to check for basic sediments and water (BS&W—a measure of unresolved emulsion).

The testing parameters, such as temperature, agitation, settling time, vary depending on the actual system. These parameters should be kept as close to the actual production treating system as possible. The results are summarized in Table 2.

In Table 2, italicized data in indicates the instances where phosphoric ester demulsifiers show equal or superior performance compared to standard treatments. More water drop indicates a faster rate of water oil separation. Lower BS&W indicates dryer oil.

TABLE 2

Performance Testing of Representative Phoshoric Ester Demulsifier Compositions

| | Water drop | | | BS & W | | |
|---|---|---|---|---|---|---|
| Demulsifier | 1 hr | 2 hr | 15 hr | BS | W | Slug |
| 1 | 10 | 33 | 47 | 1.1 | 5.2 | 6.0 |
| 2 | 9 | 19 | 41 | 1.2 | 4.6 | 5.4 |
| 3 | 5 | 5 | 10 | 1.6 | 7.4 | — |
| 4 | 7 | 7 | 8 | 1.8 | 6.0 | — |
| 5 | 10 | 10 | 10 | 1.6 | 5.6 | — |
| 6 | 10 | 10 | 11 | 2.0 | 3.0 | — |
| 7 | 3 | 3 | 10 | 24.0 | 24.0 | — |
| 8 | 9 | 10 | 22 | 5.4 | 0.2 | 4.8 |
| 9 | 8 | 11 | 18 | 4.4 | 0.4 | 4.1 |
| 10 | 10 | 11 | 19 | 4.8 | 0.4 | 4.4 |
| 11 | 9 | 10 | 13 | 5.2 | 0.4 | 5.2 |
| 12 | 4 | 7 | 10 | 3.4 | 1.2 | 3.6 |
| 13 | 3 | 3 | 22 | 0.4 | 2.8 | 3.0 |
| 14 | 2 | 2 | 19 | 0.4 | 2.0 | 2.4 |
| 15 | 4 | 4 | 20 | 0.6 | 2.2 | 2.4 |
| 16 | 6 | 9 | 20 | 1.4 | 2.2 | 3.6 |
| 17 | 4 | 9 | 28 | 6.0 | 28.0 | — |
| 18 | 3 | 9 | 33 | 20.0 | 0.6 | — |
| 19 | 7 | 10 | 42 | 13.0 | 6.0 | — |
| 20 | 1 | 10 | 40 | 11.0 | 6.0 | — |
| 21 | 6 | 10 | 34 | 2.1 | 0.4 | — |
| 22 | 5 | 9 | 32 | 2.2 | 2.0 | — |
| 23 | 1 | 4 | 19 | 4.0 | 4.0 | — |
| 24 | 8 | 26 | 45 | 0.2 | 5.8 | 6.0 |
| 25 | 6 | 12 | 48 | 0.2 | 2.0 | 2.0 |
| 26 | 7 | 8 | 14 | 3.2 | 1.6 | 4.4 |
| 27 | 30 | 40 | 50 | 0.2 | 3.9 | 4.0 |
| 28 | 4 | 28 | 40 | 0.2 | 2.4 | 2.6 |
| 29 | 3 | 18 | 48 | 1.0 | 12.0 | — |
| 30 | 7 | 6 | 42 | 0.3 | 4.8 | 3.1 |

As shown in Table 2, the phosphoric ester demulsifier compositions of this invention exhibit comparable or superior performance when compared to the corresponding demulsifiers which do not contain phosphoric ester linkages.

Changes can be made in the composition, operation and arrangement of the method of the present invention described herein without departing from the concept and scope of the invention as defined in the following claims:

The invention claimed is:

1. A phosphoric ester demulsifier comprising the reaction products of one or more polyalkylene glycols and about 0.001 to about 1.0 molar equivalents of one or more phosphorous compounds selected from phosphorous oxychloride, phosphorous pentoxide and phosphoric acid wherein the polyalkylene glycols are selected from the group consisting of reaction products of $C_4$–$C_{12}$, glycols with at least one of ethylene oxide and propylene oxide wherein the polyalkylene glycol is cross-linked by reaction with a cross linking agent having at least two functionalities capable of reacting with hydroxyl groups.

2. The demulsifier of claim 1 wherein the cross linking agent is bisphenol A epichlorohydrin.

3. A phosphoric ester demulsifier prepared by reacting a mixture of one or more alkylphenol-formaldehyde resin alkoxylates and one or more polyalkylene glycols with about 0.001 to about 1.0 molar equivalents of one or more phosphorous compounds selected from phosphorous oxychloride, phosphorous pentoxide and phosphoric acid.

4. The demulsifier of claim 3 wherein the alkylphenol-formaldehyde resin alkoxylate is selected from the group consisting of nonylphenol-formaldehyde resin alkoxylate, butylphenol-formaldehyde resin alkoxylate and amylphenol-formaldehyde resin alkoxylate, or a mixture thereof and the polyalkylene glycol is selected from the group consisting of $C_{4-12}$ glycol base polyethylene glycols, $C_{4-12}$ glycol base polypropylene glycols, $C_{4-12}$ glycol base polyethylene/polypropylene block copolymers, $C_{4-12}$ glycol base polyethylene/polypropylene mixed copolymers and $C_{4-12}$ glycol base cross-linked polyalkylene glycols.

5. The demulsifier of claim 3 wherein the polyalkylene glycol and alkylphenol-formaldehyde resin alkoxylate are cross-linked by reaction with a cross linking agent having at least two functionalities capable of reacting with hydroxyl groups.

6. The demulsifier of claim 5 wherein the cross linking agent is bisphenol A epichlorohydrin.

7. The demulsifier of claim 3 wherein the phosphoric compound is phosphorous oxychloride.

8. The demulsifier of claim 3 prepared by reacting a mixture of one or more alkylphenol-formaldehyde resin alkoxylates and one or more polyalkylene glycols with about 0.01 to about 0.5 molar equivalents of phosphorous oxychloride.

9. The demulsifier of claim 8 wherein the alkylphenol-formaldehyde resin alkoxylate is nonylphenol-formaldehyde resin alkoxylate.

10. A method of preparing a phosphoric ester demulsifier comprising reacting a mixture of one or more alkylphenol-formaldehyde resin alkoxylates and one or more polyalkylene glycols with about 0.001 to about 1.0 molar equivalents of one or more phosphorous compounds selected from phosphorous oxychloride, phosphorous pentoxide and phosphoric acid.

11. A demulsifier composition comprising one or more phosphoric ester demulsifiers according to claim 3.

* * * * *